US007089505B2

(12) United States Patent
Nagahara et al.

(10) Patent No.: US 7,089,505 B2
(45) Date of Patent: *Aug. 8, 2006

(54) INFORMATION PROCESSING APPARATUS AND INFORMATION DISPLAY METHOD

(75) Inventors: Junichi Nagahara, Tokyo (JP); Toshikazu Minoshima, Kanagawa (JP)

(73) Assignee: Sony Corporation, Tokyo (JP)

( * ) Notice: Subject to any disclaimer, the term of this patent is extended or adjusted under 35 U.S.C. 154(b) by 444 days.

This patent is subject to a terminal disclaimer.

(21) Appl. No.: 10/300,622

(22) Filed: Nov. 21, 2002

(65) Prior Publication Data

US 2003/0071856 A1    Apr. 17, 2003

Related U.S. Application Data

(63) Continuation of application No. 08/776,957, filed as application No. PCT/JP96/01664 on Jun. 17, 1996, now Pat. No. 6,608,640.

(30) Foreign Application Priority Data

Jun. 16, 1995   (JP) .................................. 7-150771

(51) Int. Cl.
   *G06F 3/00*   (2006.01)
(52) U.S. Cl. ...................................... 715/848; 715/854
(58) Field of Classification Search ................. 715/848, 715/854, 764, 853, 804
   See application file for complete search history.

(56) References Cited

U.S. PATENT DOCUMENTS 5,491,743 A    2/1996  Shiio et al.
5,524,195 A    6/1996  Clanton, III et al.
5,608,850 A    3/1997  Robertson
5,621,906 A *  4/1997  O'Neill et al. .............. 715/848
5,678,015 A * 10/1997  Goh .......................... 715/782

FOREIGN PATENT DOCUMENTS

| EP | 0 618 526 A2 | 10/1994 |
| JP | 2-236619 | 9/1990 |
| JP | 5-233199 | 9/1993 |
| JP | 7-295778 | 11/1995 |
| JP | 8-101758 | 4/1996 |
| WO | WO 94/08309 | 4/1994 |

* cited by examiner

Primary Examiner—Cao (Kevin) Nguyen
(74) Attorney, Agent, or Firm—Oblon, Spivak, McClelland, Maier & Neustadt, P.C.

(57) ABSTRACT

In an information processing apparatus and an information display method of this invention, user operates client computer to connect it to server computer by using communication line to carry out, when user accepts offer of service, e.g., offer of information, video viewing or order of goods, etc., an operation to display entrance hall within virtually actualized space on the display of the client computer, and to further display thereon plural shops by a specific pattern in relation to the entrance hall. As an example of the specific pattern, there is used a pattern such that entrance hall is disposed at one side of polygon, respective shops are disposed at other respective sides, and the entrance hall is caused to have a height capable of viewing other respective shops by bird's eye. Thus, in the three-dimensional GUI, the retrievability and the functional availability are increased. In addition, it becomes possible to also adopt, in a natural form, the concept with which many users who have used the two-dimensional GUI are familiar.

6 Claims, 7 Drawing Sheets

INFORMATION PROCESSING APPARATUS AND INFORMATION DISPLAY METHOD

TECHNICAL FIELD

This invention relates to an information processing apparatus in which user operates the client computer to connect it to the server computer by using communication line to carry out service, e.g., offer of information, video viewing/listening or order of goods, etc., and an information display method suitable when displaying (picture) image to carry out interface with user.

BACKGROUND ART

In recent years, there are being put into practical use on line network service systems adapted for connecting (linking) the server computer which is the central information processing unit and the client computer which is the information processing unit of the terminal of user, e.g., in home, etc. through cable, telephone line or network, etc. so that user accepts offer of various information from the server computer or accepts services such as video viewing/listening or order of goods, etc. on the corresponding client computer.

Meanwhile, while at the initial stage where the network service system began being constructed, the interface between user and the client computer was caused to be text base (i.e., character base), such a user interface by two-dimensional graphical display (graphical user interface which will be called GUI hereinafter) to display two-dimensional graphical (picture) image on the display of the monitor unit connected to corresponding client computer has been used in recent years, and GUI by the three-dimensional graphical display has been also used nowadays.

In the case of the network service using the user interface of the test base, since, e.g., key word retrieval, etc. can be carried out in a manner substantially similar to the document preparation unit (so called word processor) or the editing unit (editor), etc., the user interface system of the text base is convenient for skilled persons, but beginners are difficult to handle such system because it takes much time until they will have become acquainted (familiar) therewith.

On the other hand, in the case of the GUI using the two-dimensional graphical display, user interface that even beginner is easy to handle is realized. In addition, more freely design construction can be made also in constructing user interface.

However, while the two-dimensional GUI can emphasize familiarity, etc. to some extent and has more improved retrievability as compared to the case of the text base, since the hierarchical structure of the two-dimensional GUI is different from the actual world, grasp of the concept of the hierarchical structure and/or familiarity with the interface are required.

On the contrary, in the case of the three-dimensional GUI, the three-dimensional graphic is used to beautifully represent, e.g., the above-mentioned service contents, or to carry out display which is three-dimensional and is close to the actual (realistic) world (i.e., display of the so-called virtually actualized space) to represent the service content, thereby making it possible to present, to user, the concept model (concretely represented picture of abstract data) and/or metaphor (picture copying actual goods). Namely, in accordance with the three-dimensional GUI, e.g., virtually actualized (virtual realistic) space is three-dimensionally displayed on the display, thereby permitting (virtually actualized space by) the interface to be closer to the actual world than in the case of the two-dimensional GUI. Thus, it becomes possible to provide representation such that user is easy to handle.

As described above, in the case of the three-dimensional GUI, it can be said that, by handling easiness particularly in use of beginner and/or advertisement/entertainment property, increased (improved) representation has been effectively provided. For example, in representing the so-called on line shopping, etc., if virtually actualized space like actual department store is constructed, use can carry out interface with the computer in a sense such that he makes shopping while freely walking therewithin. Further, also in the case where adjustment is carried out, the three-dimensional GUI system is adapted to facilitate user to understand that it is sufficient to go to the register within the virtually actualized space. In addition, not only the retrieval with concrete purpose as in the case of carrying out shopping within the virtually actualized space, but also, e.g., service like window-shopping can be realized. Thus, new representation can be made.

However, in the case of the three-dimensional GUI, as the result of the fact that the virtually actualized space becomes too close to the actual world, it can be said that the system using the three-dimensional GUI has conversely become difficult to use to speak from a viewpoint of the utility as tool, i.e., the aspect as the user interface.

For example, there are many instances where in such cases where we usually go to the town or the department store, etc. of the actual world, when the town and/or the department store of the actual world are the first place, we stray on the road (lose our way) and are consequently apt to be confused or puzzled. The fact similar to the above is pointed out as the problem also in the case of the three-dimensional GUI. Namely, the fact that it is impossible to grasp the current position, the fact that when guide is required, it is impossible to immediately ask necessary information, the fact that virtual user must go to the place of the information service center or information service panel for the purpose of accepting guide, the fact that means for arriving at the target is unknown, the fact that it takes much time (it is possible to carry out short-cut), the fact that it takes much time for retrieval, and the like are pointed out as the problems. As stated above, in the case of the three-dimensional GUI, as the result of the fact that the virtually actualized space is caused to become too close to the actual world, there are problems, e.g., "stray on the road (structural grasping becomes difficult)", "retrievability is lowered", and "it takes much time until virtual user arrives at the target contents", etc. It is to be noted that, in the case of the existing three-dimensional GUI, since such an approach has been employed to allow the virtually actualized space to be close to the actual world as far as possible, so only the merits previously described are apt to be emphasized, i.e., it can be said that the problems at the fundamental portion like the above-described demerits have not yet been solved.

Accordingly, in the case of designing the three-dimensional GUI, there is the necessity of carrying out design of spatial structure for interface in consideration of facts as described above.

This invention has been made in view of such actual circumstances, and its object is to provide an information processing apparatus and an information display method in which, in the case where the three-dimensional GUI is used, the retrievability and functional availability are increased, and the concept with which many users who have used the two-dimensional GUI are familiar can be adopted in a natural form.

DISCLOSURE OF THE INVENTION

An information processing apparatus of this invention comprises: control means for controlling view point information of virtual user within virtual space in accordance with input information from user; memory means for storing virtual space structured data (data structured in a manner adapted to virtual space), the virtual space structured data being data caused to be of hierarchical structure with each of predetermined areas obtained by dividing the virtual space being as node, and indicating that plural objects and entrance hall area for collectively or panoramically displaying the objects, which are linked to low order node, are disposed within the predetermined area of the virtual space; and display means for displaying the virtual space on the basis of the virtual space structured data which has been read out in accordance with the view point information of the virtual user.

In this case, the virtual space structured data in the information processing apparatus of this invention is data indicating that the entrance hall area is disposed at one side of polygon, the objects are disposed at other respective sides thereof, and the entrance hall area is disposed at a position where the inside of the polygon is viewed by bird's eye. In addition, the virtual space structured data in the information processing apparatus of this invention is data indicating that linear corridor area connected to the entrance hall area is disposed within the predetermined area, and the objects are disposed along the corridor area. In this case, the virtual space structured data may be data indicating the objects are disposed only one side of the corridor area.

Further, an information display method of this invention comprises: a control step of controlling view point information of virtual user within virtual space in accordance with input information from user; a read-out step of reading out, from a memory unit, in accordance with the view point information of the virtual user, virtual space structured data caused to be of hierarchical structure with each of predetermined areas obtained by dividing the virtual space being as node, and indicating that plural objects and entrance hall area for collectively or panoramically displaying the objects, which are linked to low order node, are disposed within the predetermined area of the virtual space; and a display step for displaying the virtual space on the basis of the virtual space structured data.

In this case, the virtual space structured data in the information display method of this invention is data indicating that the entrance hall area is disposed at one side of polygon, the objects are disposed at other respective sides thereof, and the entrance hall area is disposed at a position where the inside of the polygon is viewed by bird's eye. In addition, the virtual space structured data in the information display method of this invention is data indicating that linear corridor area connected to the entrance hall area is disposed within the predetermined area, and the objects are disposed along the corridor area. In this case, the virtual space structured data may be data indicating that the objects are disposed only at one side of the corridor area.

Namely, in accordance with this invention, in order to allow the spatial configuration itself within the virtual space (virtually actualized space) to be a part of user interface, the entrance hall is displayed within the virtually actualized space, and plural objects respectively corresponding to plural services are displayed within the virtually actualized space by a specific pattern related to the entrance hall.

BEST MODE FOR CARRYING OUT THE INVENTION

Preferred embodiments of this invention will now be described with reference to the attached drawings.

Prior to describing the more practical content of this invention, the entire system of the embodiment of this invention will now be described with reference to FIGS. 1 and 2.

Figure 1:
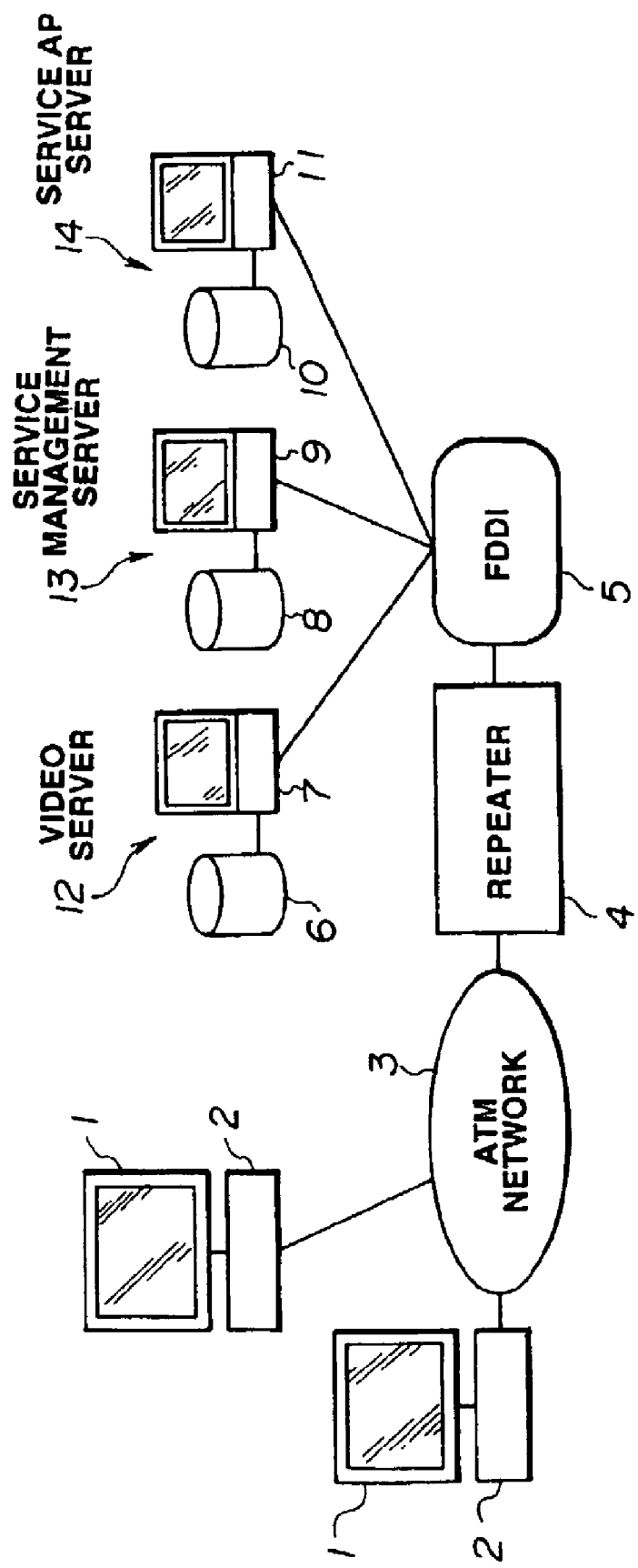
FIG. 1 is a view showing the entire configuration of the system of an embodiment of this invention.

In FIG. 1, client computers 2 are connected to, e.g., a service management server 13, a video server 12 and a service AP server 14 of the service supply side through a large-scale ATM (Asynchronous Transfer Mode) network 3, a repeater 4 and a FDDI (Fiber Distribution Data Interface) section 5. In this case, the ATM refers to the asynchronous transfer mode. In this ATM, transmit data is divided into fixed length data of 48 byte units in a manner independent of kind of data to add header of 5 bytes including address information of data transmission destination to the fixed length data to transmit data in units called "cell" of 53 bytes in total. The cells which have been sent to the ATM network 3 are subjected to switching by the ATM switch on the basis of header information. Then, corresponding cell which has arrived at the target receiving side terminal is restored (reconstructed) into the original data on the basis of the header information. This ATM network 3 is characterized by providing ability of transferring speech, moving picture and/or computer data in a mixed state. In addition, the FDDI is the medium access system of the token passing system of 100 M bits/sec. using the optical fiber.

The video server 12 is composed of a server computer 7 and a data storage unit 6 consisting of, e.g., hard disc or optical disc, etc. Within the data storage unit 6, digital video data and/or digital audio data which have been processed into data of, e.g., format of the MPEG, etc. which will be described later are stored. From the data storage unit 6 of the video server 12, the digital video data or the digital audio data corresponding to request of the client computer 2 is read out. The data thus read out is transferred to the client computer 2.

The service AP server 14 is similarly composed of a server computer 11 and a data storage unit 10. Within the data storage unit 10, data or script which provides basis of three-dimensional picture is stored as application (AP) program data. From the data storage unit 10 of the service AP server 14, the application program data, etc. is read out in accordance with request of the client computer 2. The data thus read out is transferred to the client computer 2.

The service management server 13 is similarly composed of a server computer 9 and a data storage unit 8. This service management server 13 accepts request from the client computer 2 to carry out management of the video server 12 or the service AP server 14 in accordance with the request.

In this case, as the video server 12 or the service AP server 14, plural servers may be respectively provided. In addition, respective servers 12, 13, 14 may be combined into a single server.

In the case of carrying out data transfer from such servers to the client computer 2, request of data transfer is first transmitted from the corresponding client computer 2. The request thus transmitted is transmitted to the server side through a unit for carrying out protocol conversion and data automatic distribution/data transfer rate (speed) conversion, etc. called repeater 4 and the FDDI interface section 5 passing through the ATM network 3.

From the server side, data is taken out in accordance with request of the client computer 2. The data thus taken out is transmitted to the client computer 2 side passing through the FDDI interface section 5, the repeater 4 and the ATM network 3. The data transmitted from the server side is caused to undergo processing for display by the client computer 2, and the data thus obtained is displayed on the display of the monitor unit 1. Thus, user interface using graphical display (the above-mentioned GUI) is constructed. Namely, the client computer 2 is operative on the basis of operation of user carried out in correspondence with graphical display on the display of the monitor unit 1. Accordingly, user can carry out operation while looking at graphical display on the display of the monitor unit 1, or accept offer of service.

Figure 2:
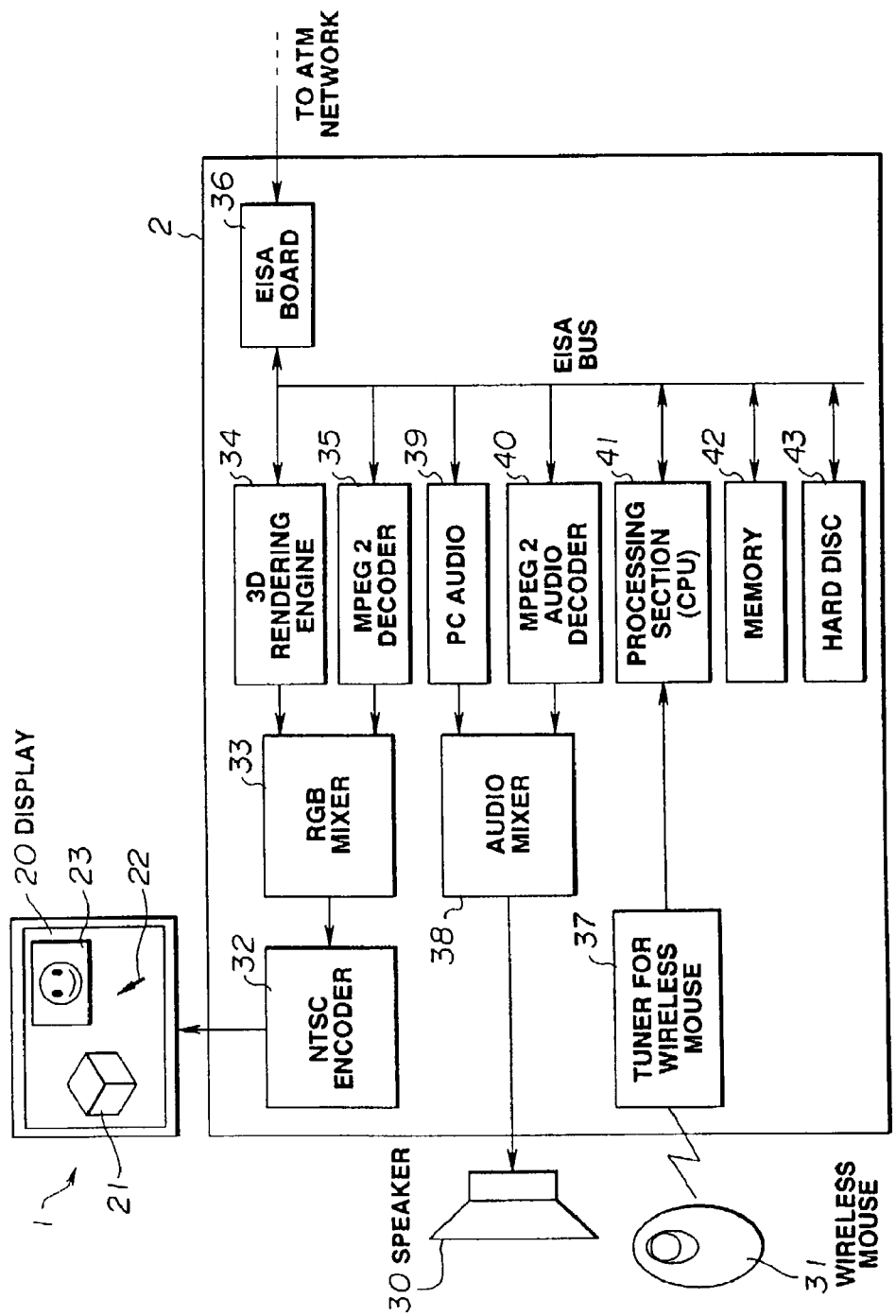
FIG. 2 is a block circuit diagram showing the more practical configuration of client computer of the embodiment.

Further, the configuration of the client computer 2 itself shown in FIG. 1 is as shown in FIG. 2, for example.

In FIG. 2, an EISA (Extended Industry Standard Architecture) board 36 is a board for communication which connects the client computer 2 and the ATM network 3. In this case, signals delivered to the EISA board 36 through the ATM network 3 are once stored onto a hard disc 43 of which write/read operation is controlled by a processing section 41 serving as control means, are and then read out therefrom in accordance with kind of data. The signals thus read out are respectively sent to corresponding ones of a three-dimensional rendering engine 34, a MPEG 2 decoder 35, a PC audio decoder 39, and a MPEG 2 audio decoder 40, etc. In this example, the hard disc 43 is memory means for storing virtual space structured data sent from the server side.

The 3D rendering engine 34 is a coordinate transform element for transforming three-dimensional coordinate data of three-dimensional object delivered from the server side as data which provides basis of the three-dimensional picture into two-dimensional coordinate data for the purpose of displaying such data on display 20 of the monitor unit 1, and is provided for realizing construction of GUI corresponding to application software. Namely, since even if corresponding object is three-dimensional object, it can be only two-dimensionally displayed on the display 20, the 3D rendering engine 34 transforms three-dimensional coordinate data of the three-dimensional object into two-dimensional coordinate data adapted to be displayed on the display 20. The 3D rendering engine 34 and the monitor unit 1 correspond to display means.

The MPEG 2 decoder 35 is a decoder for expanding digital video data compressed by the standard of the MPEG 2. In this case, the MPEG (Moving Picture Experts Group) 2 is the international standard (specification) for compression/expansion technology of moving picture.

A RGB mixer 33 mixes data from the 3D rendering engine 34 and video data from the MPEG 2 decoder 35 so that they can be displayed at the same time on the display 20.

Since video data from the RGB mixer 33 is component video data consisting of R (Red), G (Green) and B (Blue) of three prime colors of light, a NTSC encoder 32 converts the component video data into composite video signal of the television standard (specification) of, e.g., NTSC (National Television System Committee). It is to be noted that in the case where the monitor unit 1 corresponds to any other television standard (specification), e.g., PAL (Phase Alternation by Line) or SECAM (sequential a memory color television system), etc., the encoder 32 is caused to be an encoder corresponding thereto.

A picture image corresponding to the video signal from the NTSC encoder 32 is displayed on the display 20 of the monitor unit 1. In this case, a pointer 22 by pointing device, a picture (pictorial image) 23 obtained by decoding video data of MPEG 2 and a picture for the GUI (e.g., three-dimensional or two-dimensional picture 21) by the 3D rendering engine 34 are displayed on the display 20 of the example of FIG. 2. In addition, picture generated from video data of the MPEG 2 and picture for the GUI may be displayed in the state where they are synthesized.

On the other hand, the PC audio decoder 39 produces (generates), e.g., sound effect by using ADPCM (Adaptive Differential Pulse Code Modulation) sound source. Moreover, the MPEG 2 audio decoder 40 expands compressed audio data of MPEG 2. The data from the PC audio decoder 39 and the data from the MPEG 2 audio decoder 40 are mixed by an audio mixer 38 so that an analog audio signal is provided. The audio signal thus obtained is sent to a speaker 30 as sound producing means. It is to be noted that in regard to output of sound from the speaker 30, stereo speech or multi-channel speech is desirable. Since, in recent years, also even with respect to the stereo speech, systems adapted for controlling phase difference of sound, etc. so that sound image can be caused to undergo three-dimensionally localization have appeared, such systems may be utilized.

Moreover, in the GUI using display on the display 20, input from user is carried out by a wireless mouse 31 which is one example of the pointing device. The client computer 2 carries out control for GUI on the basis of point information transmitted from the wireless mouse 31 in accordance with the user input operation.

To speak in more practical sense, the point information transmitted from the wireless mouse 31 is received by a tuner 37 for wireless mouse. The point information thus received is sent to the processing section 41. This processing section 41 comprises CPU (Central Processing Unit). Namely, the processing section 41 controls respective components through bus on the basis of program data held in a program ROM of a memory 42 having function as the program ROM and a work RAM, and carries out control of GUI on the basis of point information from the wireless mouse 31. In addition, the processing section 41 serves to carry out (processing for) communication with the computer of the server side as occasion demands.

It is to be noted that, as the pointing device, not only the wireless mouse 31 but also various tools, e.g., ordinary mouse, track ball, joy stick and so called touch panel in which coordinate position on the display 20 and coordinate position on the panel are in correspondence with each other, etc. may be used. Moreover, while the example where the 3D rendering engine 34 and the MPEG 2 decoder 35, etc. are respectively provided as independent chips is disclosed in the example of FIG. 2, the processing section 41 may carry out, by software, various signal processing by these components.

The more practical operation of service providing by on-line with respect to user in the case where system of FIGS. 1 and 2 as described above is used will be described below.

Initially, in the case of connecting, on the network, the client computer 2 and the computer of the server side (the computer 9 of the service management server 13 in this case), when connection designation operation by the pointing device is given from user, the client computer 2 carries out connection to the computer 9 of the service management server 13 of the server side through the network. Further, when input of request for offer of information by the pointing device is given from user, the client computer 2 sends out request to designate information which is desired to be offered with respect to the computer 9 of the service management server 13 of the server side.

The computer 9 of the service management server 13 of the server side is operative so that when the request is delivered from the client computer 2 through the network, it controls the video server 12 and/or the service AP server 14 in accordance with the request to thereby transfer data and software which will be described below to the client computer 2. Namely, in order to realize service offer using the virtually actualized space as described below, e.g., script describing behavior within the virtually actualized space, three-dimensional coordinate data of the virtually actualized space, speech data of the virtually actualized space, script describing selection of instructions with respect to user from the client computer 2, etc., and various data required for processing are transferred from the server side.

The client computer 2 once records, onto the hard disc 43, the data received from the computer of the server side thereafter to present, to user, virtually actualized world generated on the basis of the data and the software received from the server side by using picture of the display 20 of the monitor unit 1 or speaker 30, etc. as occasion demands.

Thus, user instructs movement direction, etc. by using the pointing device while carrying out viewing/listening of the virtually actualized world presented by the client computer 2 to wander within the virtually actualized world to operate operation button, etc. provided at the pointing device to carry out action with respect to objects or facilities within the virtually actualized world to thereby have ability of accepting offer of service.

Namely, the client computer 2 responds by view point position, line of sight direction, speech and movement or behavior of object within the virtually actualized space in correspondence with operation of the pointing device by user in accordance with the script to present, to user, virtually actualized world by using the display 20 of the monitor device 1 and the speaker 30 as if user enters the inside of the virtually actualized space. In addition, the client computer 2 also carries out offer of various information, speaking or order of goods (article), etc. with respect to user in accordance with the description of the script. The server computer sends, back to the client computer 2, data of the service content corresponding to the request from the client computer 2 based on the operation by user. Thus, user can accept offer of service.

In the service providing by on line as described above, in the system of this embodiment, when the client computer 2 makes connection to the server computer by using cable, communication line, or network, etc. in accordance with operation by user to accept service, e.g., offer of information, video viewing/listening or order of goods, etc., the client computer 2 carries out three-dimensional graphical display of virtually actualized space, e.g., virtual town space (Town Metaphor) as the concept model (concretely represented picture of abstract data) or metaphor (picture copying actual article) for user on the display 20 of the monitor unit 1 connected to the client computer 2 to provide the service contents in a form close to the case where user actually accepts service, etc. within the actual world to thereby realize interface close to direct manipulation such that user moves or moves object within the actual world.

In this case, within the virtually actualized space constructed as the three-dimensional GUI in a system as described above, respective one services prepared at the server side are displayed on the display 20 as three-dimensional graphics copying virtual buildings such as shop or building, etc., and goods information, service information and interior (furniture within the shop) belonging to corresponding shop or building are represented as object. However, there is the problem that if three-dimensional virtually actualized space is constituted with these objects at random through excess of pursuit of actuality (reality) of the three-dimensional space, much time is required for user who operates the client computer 2 until he finds out target object.

Figure 3:
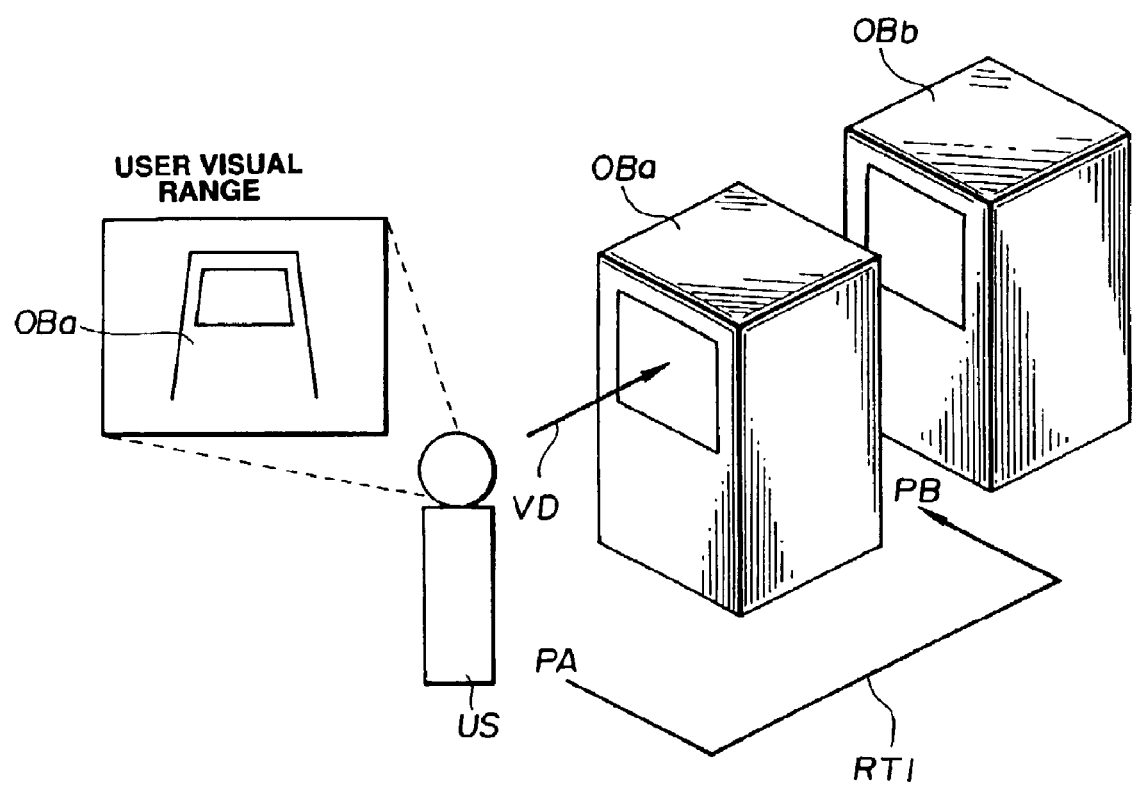
FIG. 3 is a view for explaining the problems in three-dimensional GUI.

A portion of three-dimensional virtually actualized space represented by computer program and data within the computer is conceptually illustrated in FIG. 3. Virtual user US in the FIG. 3 mentioned above is modellic image for indicating virtual view point coordinates and virtual line of sight direction of user for displaying picture within the three-dimensional virtual space on the display 20. In such cases that, in the state where, e.g., object OBa and object OBb are arranged in parallel (juxtaposed) within such three-dimensional virtually actualized space, virtual user US is positioned in front of the object OBa and the line of sight direction is along (in correspondence with) the direction indicated by arrow VD in the figure, the object OBb is not displayed because it is hidden behind the object OBa within the visual range of the virtual user US, i.e., picture image displayed on the display 20. Accordingly, in order to allow the object OBb to fall within the visual range of the virtual user US, i.e., in order to display the object OBb on the display 20, user must operate the pointing device connected to the client computer 2 to move the virtual user US positioned on the coordinates of the point PA to the coordinate position of the point PB tracing, e.g., the route RT1 within the virtually actualized space.

Here, in such cases that user who operates the client computer 2 is, e.g., beginner, or there is margin in time, or in such cases that virtual user desires to conduct window-shopping within the vertically actualized space, the user mentioned above little feels inconvenient that the view point of the virtual user US is moved to the position of the point PB in front of the object OBb tracing the route RT1. However, for user who has experienced that he utilized the above-mentioned service several times, and has already known the position where the target object exists, it is rather inconvenient to take a procedure to move the view point of the virtual user US up to the portion in front of the target object, i.e., the coordinate position of the point PB tracing the route RT1.

Meanwhile, since the two-dimensional display which is the table or list or the menu tree structure is excellent in the ability of indication as a list and the retrievability of items to be retrieved because quantity of information which can be displayed at a time is greater than that of the three-dimensional display. In view of this, an approach is conceivable to two-dimensionally display virtually actualized space ordinarily three-dimensionally displayed, e.g., by the view point from the sky (i.e., carry out display like a map), or to two-dimensionally display respective objects as a list or table to improve (increase) easiness in the retrievability or the display as a list of objects (i.e., retrieval or display as a list of service information) within the virtually actualized space. However, simply implementing of such great switching display to two-dimensionally display, as a list, image of picture only with respect to corresponding portion when there is a need to carry out the retrieval or the display as a list in the case where three-dimensional virtually actualized space as described above is displayed conversely becomes it difficult to mentally conceptually understand and relevantly consider the structural linkage (connection) of the virtually actualized world, or the structure of the service itself.

In view of the above, in the system of the embodiment of this invention, display is carried out so as to have ability of carrying out bird's eye view or panoramic view, within the visual range of the virtual user US, objects existing within the virtually actualized space, i.e., so as to permit user to visually recognize, on the display 20, all objects within the virtually actualized space displayed on the display 20 as one world (predetermined area), and such a virtually actualized space configuration to permit user to easily recognize service contents provided in correspondence with respective objects and the structure of the services themselves is used. In this case, the worlds respectively corresponds to plural predetermined areas obtained by dividing the virtually actualized space, and are dealt as units of sets displayed on the display 20 as the virtually actualized space. For example, the entirety of town (city) including shops or buildings, the inside of one shop, the inside of a certain floor of the building, the inside of the room, the external (outer) world in the case where the outside is viewed from the inside of the building which are represented as the virtually actualized space are respective one worlds. In addition, quantities of data constituting respective one worlds vary in dependency upon kinds of respective worlds. In the case where the client computer 2 provides data access to the server side, there are instances where, in dependency upon data quantity corresponding to one world, data corresponding to one world is accessed, data corresponding to plural worlds is accessed, data corresponding to one world is stored also into the memory of the client computer 2, or data corresponding to plural worlds is stored thereinto.

Explanation of the above-described virtually actualized space configuration in the system of the embodiment of this invention will be given below.

Figure 4:
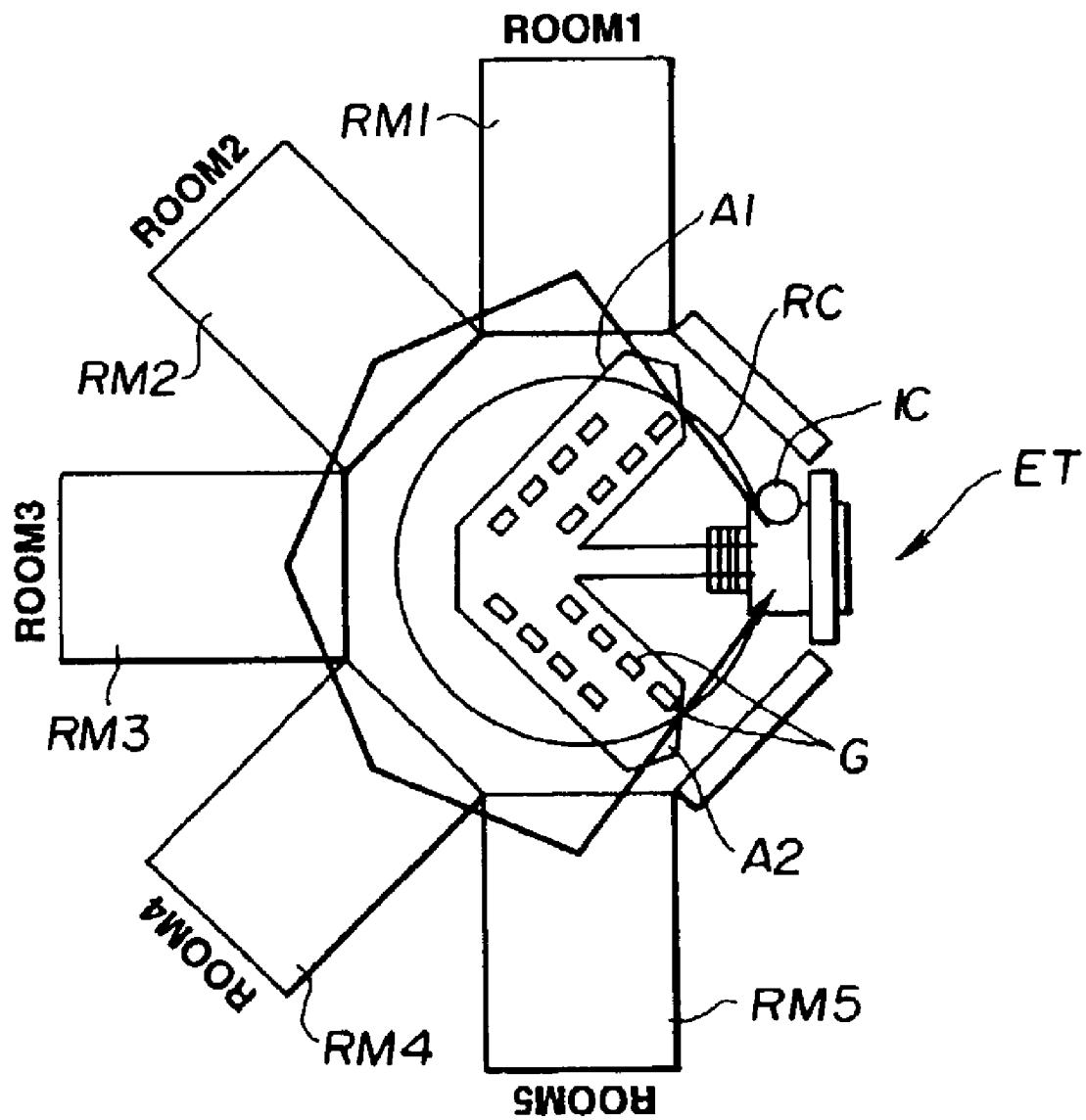
FIG. 4 is a view used for explanation with respect to three-dimensional structure representation of virtually actualized space of a first embodiment.

Initially, an example of the virtually actualized space configuration of a first embodiment of this invention will be described with reference to FIG. 4. This FIG. 4 illustrates, in a model form, the state where shop which provides service within the virtually actualized space constructed by computer program and data within the server computer and displayed on the display 20 by the client computer 2 is viewed from the sky (top). Accordingly, the shop of FIG. 4 is different from the shop actually displayed on the display 20 as the virtually actualized space. The shop within the virtually actualized space is composed of entrance hall ET which is the entrance space of the shop, recommended corner RC provided at the hall communicating with respective rooms of the shop, rooms RM1~RM5 for providing services classified every categories, and information counter IC for displaying, e.g., information of the service contents of that shop.

The information counter IC is disposed at the entrance hall ET. Accordingly, when the visual range of the virtual user US is directed to the information counter IC, information of the service contents of the shop is displayed on the display 20.

The recommended corner RC is positioned in the center of the shop. In this corner, goods of the highest precedence (priority), i.e., plural goods G that this shop desires to carry out, to the maximum degree, advertisement with respect to user are exhibited. As the goods G, e.g., newly arrived (received) goods or goods of high buying sentiment, etc. are enumerated. Moreover, the shape of the hall within the shop where this recommended corner RC is disposed is, e.g., polygonal shape. On respective sides of the polygon-shaped hall, rooms RM1~RM5 for providing respective services and entrance hall ET are disposed. It is to be noted that the shape of the hall within the shop where the recommended corner RC is disposed may be, e.g., circular shape. In this case, rooms RM1~RM5 for providing respective services and entrance hall ET may be disposed on the circumference of the circular hall.

The respective rooms RM1~RM5 are the places for providing services classified every categories. If the above-mentioned shop is the video shop, video viewing (/listening) services classified every genre, e.g., "horror", "adventure", "action", "comedy" and "others", etc. are provided at respective rooms. It is to be noted that the configuration of insides of these respective rooms may be such that rooms classified every further detailed categories are disposed similarly to the above-mentioned shop, or may be configuration such that the insides of respective rooms are completed and only objects indicating goods are exhibited.

Figure 5:
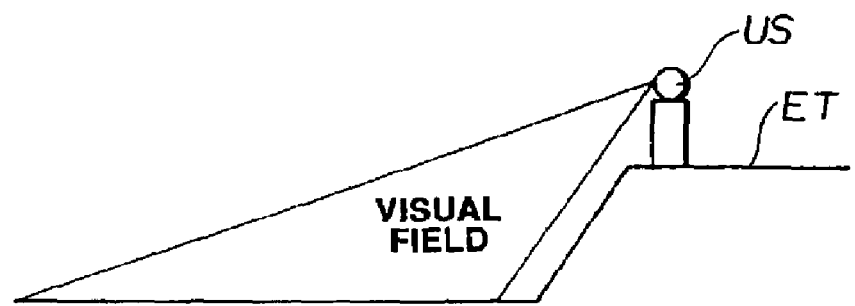
FIG. 5 is a view used for explanation with respect to position of entrance hall and visual field of virtual user from the entrance hall within the virtually actualized space of the first embodiment.

The entrance hall ET is the place corresponding to the entrance of the shop, and is the place serving as the starting point of action for allowing user to accept services within this shop. Moreover, the entrance hall ET is disposed at a position higher than other portions within the shop as shown in FIG. 5. In this case, FIG. 5 illustrates, in a model form, height of the entrance hall ET of the shop within virtually actualized space constructed by computer program and data within the server computer and displayed on the display 20 by the client computer 2 and the visual field of the virtual user US when the virtual user US is disposed on the entrance hall ET.

As stated above, in the virtually actualized space of the first embodiment, since there is employed a configuration such that the entrance hall ET is disposed at the position higher than other portions within the shop, in the case where the view point position of the virtual user US is placed on the entrance hall ET, it is possible to carry out, within the visual field (visual range) of the virtual user US, bird's eye view or panoramic view of the rooms RM1~RM5 which provide respective services and goods G exhibited at the recommended corner RC, i.e., services that user can accept within the shop. In addition, in the virtually actualized space of the first embodiment, since the shape of the hall within the shop where the recommended corner RC is disposed is caused to be polygonal shape or circular shape, and rooms RM1~RM5 for carrying out respective services are also disposed around the recommended corner RC, ability of bird's eye view, i.e., panoramic display can be further improved (increased). As described above, in accordance with the virtually actualized space of this embodiment, all service select objects can be displayed within the entire picture (on screen) of the display 20.

Figure 6:
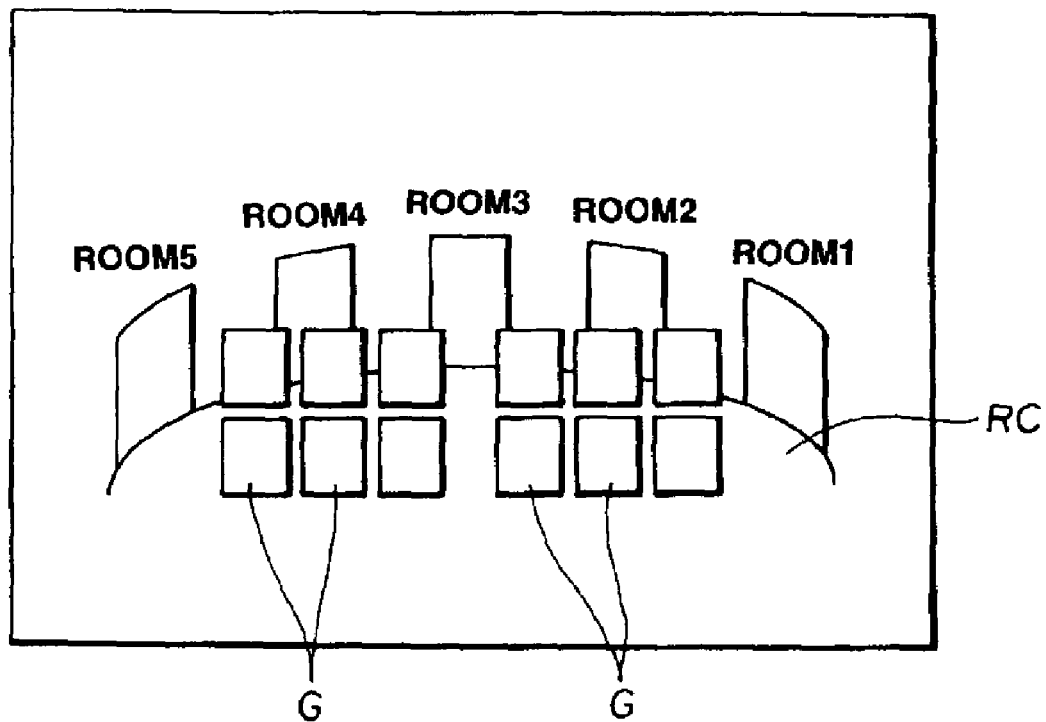
FIG. 6 is an image in the case where the visual range of virtual user when other portion of the virtually actualized space of the first embodiment is viewed from the entrance hall is displayed on display.

Explanation will be given in more practical sense. On the display 20 (i.e., within the visual field of the virtual user US), as shown in FIG. 6, not only goods G disposed at the recommended corner RC, but also doors of entrances to the rooms RM1~RM5 for providing services different from each other disposed around the recommended corner RC are displayed in a panoramic manner. In the example of FIG. 6, signboards for indicating names or symbols designating service contents of the respective rooms RM1~RM5 are also displayed, as objects Room 1~Room 5, at the upper portions of the doors of the entrances to the respective rooms RM1~RM5. For this reason, user can recognize, from the signboards Room 1~Room 5, the service contents provided at the respective rooms RM1~RM5.

At this time, when an operation to click, by the pointing device, e.g., the doors of the entrances to the respective rooms RM1~RM5 or the signboards Room 1~Room 5 is made by user, the client computer 2 switches (picture) display on the display 20 to picture display for accepting services provided at the respective rooms RM1~RM5.

In the case where the three-dimensional spatial structure which has been explained with reference to FIGS. 4~6 as described above is used as GUI, movement of the virtual user US and movement of the view point thereof corresponding to operation of the pointing device by user are carried out, e.g., in a manner as described below.

Initially, when the virtual user US is disposed at the entrance hall ET within the virtually actualized space, (picture) image that falls within the visual field of the virtual user US, i.e., (picture) image displayed on the display 20 results in an image as shown in the FIG. 6 mentioned above.

Then, in the case where virtual user US carry out, in order, inspection (viewing) of goods G exhibited at the recommended corner RC, the virtual user US is moved to the inside of the recommended corner RC from the entrance hall ET to further move it (him) around the recommended corner RC.

At this time, setting is made such that the view point and the movement of the virtual user US are fixed to some extent. Namely, when designation to carry out inspection (viewing) of the inside of the recommended corner RC is made by the pointing device, the view point of the virtual user US is caused to be passed through the movement route A1 indicated by arrow in FIG. 4.

In the case where the virtual user US has been passed through this route A1, image that falls within the visual range of the virtual user US when he falls from the entrance hall ET down to the recommended corner RC is first displayed on the display 20. Then, image that falls within the visual range of the virtual user when he goes (moves) round the recommended corner RC while looking at the goods G is displayed on the display 20. Thereafter, image that falls within the visual range of the virtual user when he comes back to the entrance hall ET is displayed on the display 20.

This route A1 is set in advance for allowing the service providing side to show goods that it desires to pay attention to user. It is to be noted that not only the line of sight of the virtual user US is moved in a manner to run his eye on the route A1, but also there may be employed an approach such that in the case where user (or virtual user) pays attention to, e.g., a certain goods (article) when the view point of the virtual user US is moving on the route A1, movement of the view point of the virtual user US is stopped in accordance with designation of stop instruction from the pointing device, thereby permitting goods of the stop point to be displayed on the display 20. In addition, when, during movement on the route A1, e.g., the entrance hall ET is clicked by the pointing device, or designation to return to the entrance hall ET by guide book having help function (displayed at, e.g., the corner, etc. of picture) is made, the virtual user is permitted to come back thereto.

It is a matter of course that not only the view point of the virtual user US is caused to be passed on the route A1 as described above, but also the view point of the virtual user US may be moved from the entrance hall ET directly to the good to which user desires to pay attention. Display on the display 20 in this case immediately shifts from the image of the entrance hall ET to the image of the corresponding goods (article).

Further, in the case where virtual user carry out, in succession, inspection (viewing) of service contents different from each other of the respective rooms RM1~RM5 from the entrance hall ET, the virtual user US is moved from the entrance hall ET to the insides of the respective rooms RM1~RM5. Also at this time, it is desirable to make a setting such that the view point and the movement of the virtual user US are fixed to some extent.

Namely, when designation to carry out inspection (viewing) of the service contents of the respective rooms RM1~RM5 is made by the pointing device, the view point of the virtual user US is caused to be passed through the movement route A2 indicated by arrow in FIG. 4.

In the case where the view point of the virtual user US is passed through the route A2, image that falls within the visual range of the virtual user US when he moves from the entrance hall ET to the inside of the first room is displayed on the display 20. Then, image that falls within the visual range of the virtual user US when he moves to the inside of the adjacent room is displayed on the display 20. At times subsequent thereto, images that fall within the visual range of the virtual user US when he moves to the insides of respective rooms are displayed in order on the display 20. Thereafter, image that falls within the visual range of the virtual user when he comes back to the entrance hall ET is displayed on the display 20.

This route A2 is also set for allowing the service providing side to present service contents of the respective rooms to user. It is to be noted that not only the line of sight of the virtual user US is moved in a manner to run his eye on the route A2 as described above, but also there may be employed an approach such that in the case where user (or virtual user) pays attention to the service content of, e.g., a certain room when the view point of the virtual user US is moving on the route A2, movement of the view point of the virtual user US is stopped in accordance with designation of stop instruction from the pointing device, thereby permitting the service content of the room of the stop point to be displayed on the display 20. In addition, when, also during movement on the route A2, e.g., the entrance hall ET is clicked by the pointing device, or designation to come back to the entrance hall ET is made by guide book having help function (displayed at, e.g., the corner, etc. of picture), the virtual user is permitted to come back thereto.

It is a matter of course that not only the view point of the virtual user US is caused to be passed on the route A2 as described above, but also the view point of the virtual user US may be moved from the entrance hall ET directly to the room to which user desires to pay attention. Display on the display 20 in this case shifts from the image of the entrance hall ET to the image of the inside of the room to which he desires to pay attention.

Figure 7:
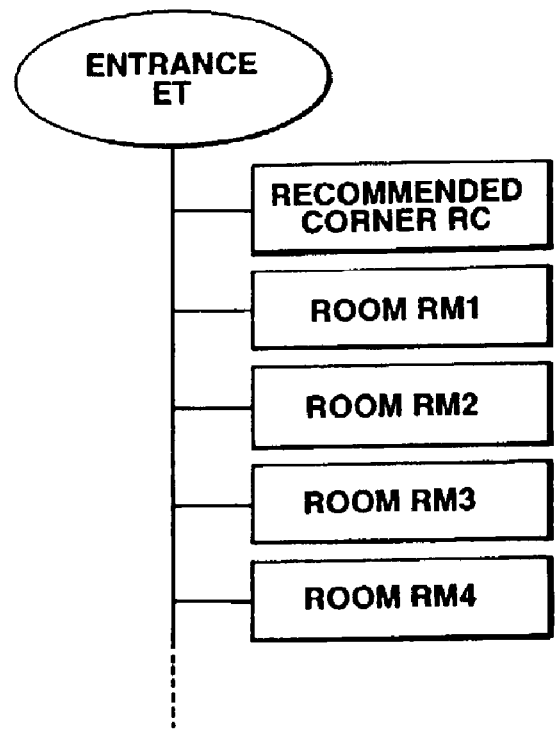
FIG. 7 is a view indicating hierarchical structure in a general menu tree form.

In order to realize facts as described above, the spatial configuration of the entrance hall ET, the recommended corner RC and the respective rooms RM1~RM5 corresponds to hierarchical structure as shown in FIG. 7. Namely, the spatial structure of this embodiment is caused to be of the hierarchical structure with the world being as node. Within the world of the virtually actualized space, as plural objects linked to the low order node, the recommended corner RC, the respective rooms RM1~RM5, and the entrance hall ET for carrying out panoramic view (display) thereof are disposed.

To speak in more practical sense, in the hierarchical structure described in the menu tree form of FIG. 7, the entrance hall ET corresponds to top menu item, and the recommended corner RC and the respective rooms RM1~RM5 respectively correspond to sub menu items. Accordingly, shift to any one of the recommended corner RC and the respective rooms RM1~RM5 can be made by one step from the entrance hall ET. In a manner opposite to the above, shift to the entrance hall ET can be also carried out by one step from the recommended corner RC and the respective rooms RM1~RM5

It is to be noted that hierarchical structure in the menu tree form as shown in the FIG. 7 mentioned above is used in generally making the spatial structure design, and also in such cases that, e.g., in a spatial structure as has been explained with respect to the FIG. 3 previously mentioned, respective objects are caused to be respectively sub menu items, and e.g., the position of the point PA is caused to be the top menu item, the above-mentioned hierarchical structure may be similarly applied. However, in the case of the spatial structure of FIG. 3, the object OBb corresponding to the sub menu item cannot be seen from the position of the point PA corresponding to the top menu item. Accordingly, it is impossible to retrieve, by one step, the object OBb from the position of the point PA to conduct shift thereto.

On the contrary, in the spatial structure according to the embodiment of this invention which has been explained with reference to FIGS. 4 to 6, when the view point position of the virtual user US exists at the object corresponding to the top menu item, i.e., the entrance hall ET, all objects corresponding to the sub menu items, i.e., the recommended corner RC and the rooms RM1~RM5 are displayed within picture (on screen) of the display 20.

As stated above, in accordance with the spatial structure according to the embodiment of this invention, shift by one step can be carried out between the top menu item and the sub menu items. It is seen that it is easy to understand the spatial structure according to the embodiment of this invention and the structure of FIG. 7 as the structure common from a conceptual point of view. In other words, such structural relationship indicates that the hierarchical structure to which reference is made when the processing section (CPU) 41 within the client computer 2 actually carries out data processing is represented entirely in the same manner within the virtually actualized space.

An example of virtually actualized space configuration of a second embodiment of this invention will now be explained. In the second embodiment, the example where the community (commonness) from a structural point of view between hierarchical structure of menu tree form as shown in the FIG. 7 mentioned above and the space configuration according to this invention is caused to be clarified to more degree as compared to the case of the first embodiment will be described. Namely, in the second embodiment, the example where the structural community between the hierarchical structure of data to which reference is made in being processed by the processing section (CPU) 41 within the client computer 2 and the three-dimensional space structure in which the ability of panoramic view or bird's eye view and the retrievability can be enhanced (increased) in a manner similar to the above is represented in more clarified form is mentioned. Explanation of more practical virtually actualized space configuration of the second embodiment will be given below.

Figure 8:
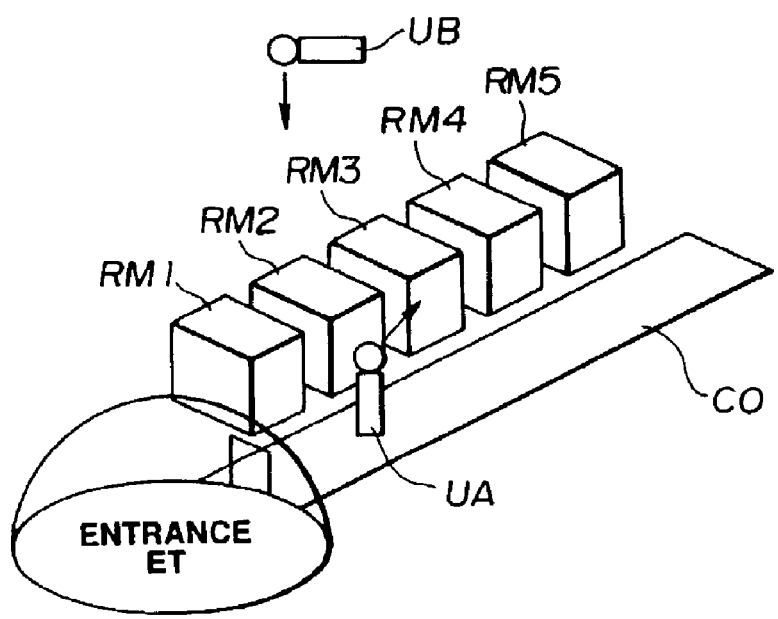
FIG. 8 is a view used for explanation with respect to three-dimensional structure representation within virtually actualized space of a second embodiment.

The state where shop which provides services within virtually actualized space constructed by computer program and data within the server computer and displayed on the display 20 by the client computer 2 is viewed obliquely from the sky (top) is shown in a model form in FIG. 8 as the drawing for explaining the virtually actualized space configuration of the second embodiment. Accordingly, the shop shown in FIG. 8 is also different from the shop actually displayed on the display 20 as the virtually actualized space. The shop within the virtually actualized space is composed of entrance hall ET which is the entrance space of the shop, corridor CO communicating with respective rooms of the shop, and rooms RM1~RM5 for providing services classified every categories. It is to be noted that, also in the configuration of FIG. 8, information counter may be disposed as in the configuration of FIG. 4.

The entrance hall ET is the place corresponding to the entrance of the shop, and is the place serving as the starting point of action for allowing user to accept services within the shop. The corridor CO is extended to the entrance hall ET, and the respective rooms RM1~RM5 are arranged in parallel (juxtaposed), e.g., at the portion corresponding to one wall surface.

The respective rooms RM1~RM5 are the places for providing services classified every categories, and services classified every categories are provided at the respective rooms similarly to the previously described first embodiment. It is to be noted that the configuration of the insides of respective rooms may be such that rooms classified every further detailed categories may be installed similarly to the above-mentioned shop, or may be configuration such that the insides of respective rooms are completed and only objects indicating goods are exhibited.

As stated above, in the virtually actualized space of the second embodiment, there is employed a structure such that the entrance hall ET and the respective rooms RM1~RM5 are connected through the corridor CO, and these rooms RM1~RM5 are juxtaposed in a form along the corridor CO. Accordingly, in the case where the view point position of the virtual user is placed at the entrance hall ET, the rooms RM1~RM5 which provide respective services, i.e., services that user can accept at this shop can be panoramically or collectively viewed within the visual field (visual range) of the virtual user.

Figure 9:
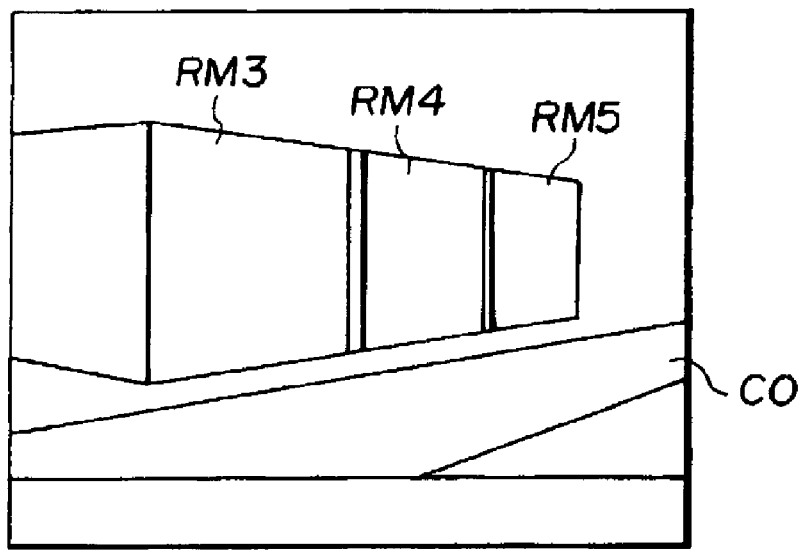
FIG. 9 is a view showing an image when the visual range of virtual user positioned at corridor side within the virtually actualized space of the second embodiment is displayed on display.

Explanation will be given in more practical sense. When the virtual user UA is disposed, e.g., on the corridor CO as shown in FIG. 8, the rooms (the rooms RM3~RM5 in the example of FIG. 9) juxtaposed along the corridor CO as shown in FIG. 9 are collectively displayed on the display 20 (i.e., within the visual field of the virtual user). In the example of FIG. 9, since the view point position of the virtual user UA is placed on the corridor CO, only partial rooms fall within the visual field of the virtual user UR. However, if the view point position of the virtual user UA is placed on the entrance hall ET, all rooms RM1~RM5 juxtaposed along the corridor CO are panoramically (collectively) displayed within the visual field of the virtual user UA, i.e., on the display 20. It is to be noted that, also in the case of the second embodiment, similarly to the first embodiment, objects of signboard for indicating names or symbols designating service contents of respective rooms RM1~RM5 may be disposed at the upper portions of the doors of the entrances of the respective rooms. Thus, user can easily recognize the service contents provided at the respective rooms RM1~RM5.

At this time, when an operation to click, e.g., by the pointing device, the doors of the entrances to the respective rooms RM1~RM5 displayed on the display 20 as described above is carried out by user, the client computer 2 switches the (picture) display on the display 20 to the picture display for accepting services provided at the respective rooms RM1~RM5.

In the case where the three-dimensional space structure, which has been explained with reference to FIGS. 8 and 9, as described above is used as GUI, movement of the virtual user UA and movement of the view point thereof corresponding to the operation of the pointing device by user are carried out, e.g., in a manner as described below.

Initially, image that falls within the visual field of virtual user when the virtual user UA is disposed at the entrance hall ET within the virtually actualized space, i.e., image displayed on the display 20 results in an image such that all rooms RM1~RM5 juxtaposed along the corridor CO are panoramically (collectively) displayed.

Further, in the case where service contents different from each other are caused to undergo inspection (viewing) in order from the entrance hall ET, the virtual user UA is moved from the entrance hall ET into the corridor CO, and is further in order into the respective rooms RM1~RM5. At this time, setting may be made such that the view point and/or movement of the virtual user UA are fixed to some extent.

Namely, when designation to carry out inspection (viewing) of the service contents of the respective rooms RM1~RM5 is made by the pointing device, image that falls within the visual range of the virtual user US when he moves from the entrance hall ET to the entrance of the corridor CO is first displayed on the display 20. Then, image that falls within the visual range of the virtual user UA when he moves into the first room is displayed on the display 20. Further, image that falls within the visual range of the virtual user UA when he moves into the adjacent room is displayed on the display 20. At times subsequent thereto, images that fall within the visual range of the virtual user UA when he moves insides of respective rooms are displayed in order on the display 20. Thereafter, image that falls within the visual range of the virtual user when he comes back to the entrance hall ET passing through the corridor CO is displayed on the display 20.

The route for carrying out inspection (viewing) of the service contents of respective rooms in the second embodiment is also set in advance for allowing the service providing side to present the service contents of respective rooms to user. It is to be noted that not only the line of sight of the virtual user UA is caused to be moved on the above-mentioned route in a manner to run his eye as described above, but also there may be employed an approach in which in the case where there is a need of paying attention to the service content of, e.g., a certain room when the view point of the virtual user UA is moving on the route, movement of the view point of the virtual user UA is stopped in accordance with designation of stop instruction from the pointing device, thereby permitting the service content of the room of the stop point to be displayed on the display 20. In addition, when, also during movement on the route, e.g., the entrance hall ET is clicked by the pointing device, or designation to come back to the entrance hall ET is made by guide book having help function (displayed at, e.g., the corner, etc. of picture), virtual user is permitted to come back thereto.

It is a matter of course that, also in the second embodiment, not only the view point of the virtual user UA is caused to be passed on the route as described above, but also the view point of the virtual user UA may be moved from the entrance hall ET directly to the room to which he desires to pays attention. Display on the display 20 in this case shifts from the image of the entrance hall ET to the image of the inside of the room to which he desires to pay attention.

Figure 10:
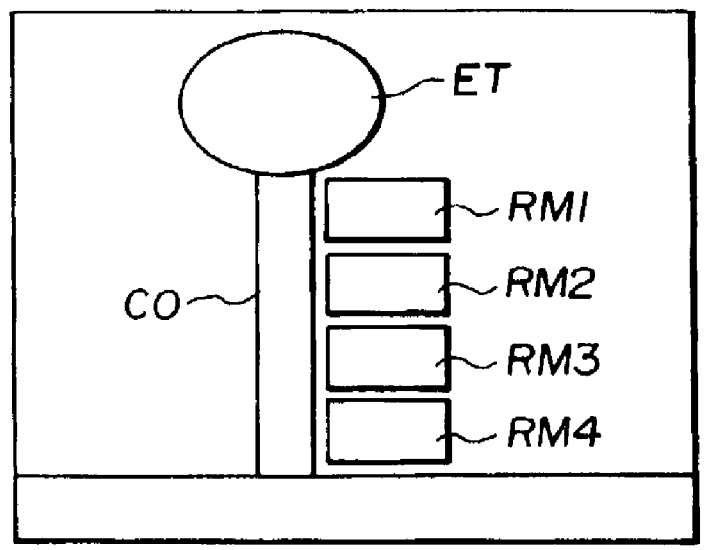
FIG. 10 is a view showing an image when the visual range of virtual user positioned in the sky (at the top) within the virtually actualized space of the second embodiment is displayed on display.

Meanwhile, in the virtually actualized space structure of FIG. 8, when, e.g., the virtual user UB is disposed in the sky (at the top portion) thereof, the entrance hall ET, the corridor CO continuous thereto and the rooms RM1~RM5 juxtaposed along the side corresponding to one wall surface of the corridor CO are displayed, as shown in FIG. 10, on the display 20 (i.e., within the visual field of the virtual user).

Looking at the display example of FIG. 10, it is seen that the structure of the second embodiment is clearly common with the structure shown in FIG. 7 from a structural point of view. Namely, in FIG. 10, the spatial structure of the entrance hall ET, the corridor CO and the respective rooms RM1~RM5 of FIG. 8 corresponds to hierarchical structure as shown in the FIG. 7 mentioned above. Namely, the entrance hall ET corresponds to the top menu item of FIG. 7, the corridor CO corresponds to the trunk portion of the menu tree structure of FIG. 7, and the respective rooms RM1~RM5 respectively correspond to sub menu items.

For this reason, also in the structure of the second embodiment, similarly to the structure of the first embodiment, shift to any one of the respective rooms RM1~RM5 can be carried out by one step from the entrance hall ET. In a manner opposite to the above, shift to the entrance hall ET can be also carried out by one step from the respective rooms RM1~RM5.

Moreover, in the structure of the second embodiment, when the view point position of the virtual user UA exists at the object corresponding to the top menu item, i.e., the entrance hall ET, all objects corresponding to the sub menu item, i.e., the rooms RM1~RM5 are displayed within picture (on screen) of the display 20.

From facts as described above, in accordance with the spatial structure according to the second embodiment of this invention, shift by one step can be carried out between the top menu item and (any one of) the sub menu items. Thus, it is seen that it is possible to clearly understand that the spatial structure according to the second embodiment and the structure of FIG. 7 are conceptually common. In other words, the structure of the second embodiment is the structure that the hierarchical structure to which reference is made when the processing section 41 within the client computer 2 actually carries out data processing is represented entirely in the same manner within the virtually actualized space. Accordingly, in the case where user who uses the system of the embodiment of this invention is a person who is familiar with the operation of the two-dimensional GUI, he can easily understand the operation method.

It is to be noted that the view point position of the virtual user UB when display as shown in the FIG. 10 mentioned above is carried on the display 20 is in the sky (at the top portion) when viewed from the virtually actualized space of FIG. 8. In the case where the virtual user UB is moved to that view point position, e.g., an operation as described below is carried out. For example, icon having help function of the name called "guide book" is prepared at the left and lower portion of picture of the display 20 to display picture image in which the guide book is actually opened within the picture (on screen) when the icon is clicked by the pointing device to carry out a display as shown in the FIG. 10 mentioned above on the guide book. In this case, as the name of the guide book, "guide", "map", "browser" and "overview", etc. are conceivable in addition to the above.

Moreover, the picture image of FIG. 10 may be picture image which faithfully reproduces the state where the virtually actualized space shown in FIG. 8 is viewed from the sky (the top), or may be simplified or patterned picture image. Further, the operation for displaying the picture image of FIG. 10 on the display 20 may be not only the operation to click icon of guide book as described above by the pointing device, but also, e.g., an operation to click, by the pointing device, the upper portion of the picture of the display 20 corresponding to the position within the virtually actualized space where, e.g., the view point position of the virtual user UB is desired to be disposed, or the like.

As described above, in the system of this embodiment, since the virtually actualized space is caused to take such a specific structure that respective objects within the virtually actualized space can undergo sweeping view or panoramic view, compatibility of satisfactory operability, easiness of understanding, practical retrievability and functional availability which are featured particularly by the three-dimensional GUI can be made. Especially, its spatial structure is caused to be of the structure of actual management system or the hierarchical structure, and an approach is employed to reflect elements as in the two-dimensional GUI as well to thereby promote correct understanding of the concept model (concretely represented picture of abstract data), thus making it possible to construct interface easy to use, which copes with various users from the beginner to the skilled person.

Namely, in the system of this embodiment, services provided within the virtually actualized space are represented as objects, e.g., "house", "room" or "shop", etc., and these respective objects have function as the three-dimensional icon, thus making it possible to improve the performance as GUI. Accordingly, user carries out an operation to directly click objects by the pointing device, or the like, thereby making it possible to realize interface close to direct manipulation (operation). Moreover, a specific pattern which can be caused to undergo sweeping of view or panoramic view is provided at the structure of the virtually actualized space to thereby realize, in this embodiment system, familiarity, good operability and easiness of information retrieval which are featured particularly by the three-dimensional GUI. Further, linkage between the virtually actualized space configuration and the hierarchical structure that the system handles can be advantageously grasped with ease.

Further, in accordance with the first embodiment of this invention, as has been explained with reference to the FIGS. 4 to 6 previously mentioned, in the three-dimensional structure of the virtually actualized space, there is employed a structured space configuration such that entrance hall ET is provided to have ability of carrying out sweeping view or panoramic view of objects corresponding to sub menu items of the same layer (level) such as the recommended corner RC or entrance doors of the rooms RM1~RM5, etc. Namely, there is employed a space configuration such that, e.g., the entrance hall ET portion is disposed at the position higher than the recommended corner RC or the entrance doors of the rooms RM1~RM5 to thereby realize way of view such that they are viewed by the bird's eye from the top, thus making it possible to sweepingly or panoramically view all elements. It is to be noted that in the case where objects cannot fall within the visual range from the entrance hall ET, it is possible to cope with such a case by changing angle of field of view of the virtual user US.

Further, in accordance with the second embodiment of this invention, as has been explained with reference to the FIGS. 8 to 10 previously described, in the three-dimensional structure of the virtually actualized space, there is employed a space configuration such that entrance hall ET is provided to connect therefrom portions corresponding to the sub menus like respective rooms RM1~RM5 through corridor CO to permit it to be seen as the entrances of the respective rooms RM1~RM5 facing to the corridor CO to further vary view point position of the virtual user, or to view them from the top (the sky). Thus, layout close to the general menu tree structure is realized. Accordingly, even user who desires to understand objects of the virtually actualized space in the state where he is conscious of the hierarchical structure, i.e., user who is familiar with the operation of the two-dimensional GUI can carry out operation without disagreement of feeling. Moreover, the three-dimensional structure of the virtually actualized space is substantially the same structure as the system management situations of actual service contents. Accordingly, also from this fact, there is less confusion in operation (manipulation) of user. It is to be noted that, in the case of accepting offer of respective service contents, selection between respective services may be carried out within the virtually actualized space, or display more closer to the hierarchical structure may be carried out as previously described to thereby directly carry out retrieval and selection of the target service from the above-mentioned display. In addition, short-cut function may be used.

Further, in the embodiments of this invention, three-dimensional GUI or the two-dimensional GUI is displayed after undergone switching therebetween without disagreement of feeling. Accordingly, by using this display, desired GUI can be constructed. Further, not only virtually actualized space obtained by carrying out the three-dimensional rendering is displayed, but also two-dimensional picture may be three-dimensionally displayed in a pseudo manner or merely two-dimensional picture itself may be displayed. Accordingly, there may be employed a method of presenting, to user, information that could not be satisfactorily represented by three-dimensional picture (particularly, in such cases that (picture) depiction (description) calculation must be carried out on the real time basis) as information that the user can most easily recognize by using picture of the representation maximumly optimized in advance in a two-dimensional manner, or a method of providing the most suitable quality in the representation such that picture of moving portion is three-dimensionally represented and still picture is two-dimensionally represented.

From facts described above, in accordance with this invention, interfaces that users from the beginner to the skilled person are respectively easy to use can be realized. Thus, unified interface is provided for user. Moreover, for the producer side of the system, reduction in preparation cost in which there is no need to prepare systems corresponding to plural different interfaces is advantageously provided.

Further, in accordance with this invention, also in the case where a person who is skilled in the two-dimensional GUI shifts to the three-dimensional GUI, he can shift in a natural form. For example, an approach is employed to switch three-dimensional picture as in the case of top view or map, thereby making it possible to quickly select the target service with the same feeling as in the case of using file browser.

INDUSTRIAL APPLICABILITY

In accordance with the information processing apparatus and the information display method of this invention, in order to allow the space configuration itself within the virtually actualized space to be a part of the user interface, entrance hall is displayed within the virtually actualized space, and plural service symbolic pictures respectively corresponding to plural services are displayed within the virtually actualized space by a specific pattern related to the entrance hole. Thus, in the user interface using three-dimensional graphical display, the retrievability and the functional availability can be increased. In addition, it becomes possible to also adopt, in a natural form, the concept with which many users who have used the user interface using the two-dimensional graphical display are familiar.

The invention claimed is:

1. An information processing apparatus comprising:
control means for controlling view point information of virtual user within virtual space in accordance with input information from user;
memory means for storing virtual space structured data, the virtual space structured data being data caused to be of hierarchical structure with each of predetermined areas obtained by dividing the virtual space being as node, and indicating that plural objects and entrance hall area for collectively or panoramically displaying the objects, which are linked to low order node, are disposed within the predetermined area of the virtual space; and
display means for displaying the virtual space on the basis of the virtual space structured data which has been read out in accordance with the view point information of the virtual user;
wherein the virtual space structured data is data indicating that the entrance hall area is disposed at a position where the objects are viewed by bird's eye.

2. An information processing apparatus as set forth in claim 1,
wherein the virtual space structured data is data indicating that, within the predetermined area, linear corridor area connected to the entrance area and the objects are disposed along the corridor area.

3. An information processing apparatus as set forth in claim 2, wherein the virtual space structured data is data indicating that the objects are disposed only at one side of the corridor area.

4. An information display method comprising:
a control step of controlling view point information of virtual user within virtual space in accordance with input information from user;
a read-out step of reading virtual space structured data from a memory unit in accordance with the viewpoint information of the virtual user, the virtual space structured data being data caused to be of hierarchical structure with each of predetermined areas obtained by dividing the virtual space being as node, and indicating that plural objects and entrance hall area for collectively or panoramically displaying the objects, which are linked to low order node, are disposed within the predetermined area of the virtual space; and
a display step of displaying the virtual space on the basis of the virtual space structured data;
wherein the virtual space structured data is data indicating that the entrance hall area is disposed at a position where the objects are viewed by bird's eye.

5. An information display method as set forth in claim 4,
wherein the virtual space structured data is data indicating that, within the predetermined area, linear corridor area connected to the entrance area is disposed and the objects are disposed along the corridor area.

6. An information display method as set forth in claim 5, wherein the virtual space structured data is data indicating that the objects are disposed only at one side of the corridor area.

* * * * *